United States Patent [19]

Gross et al.

[11] Patent Number: 4,457,738
[45] Date of Patent: Jul. 3, 1984

[54] ANTI-BACKLASH DOUBLE UNIVERSAL FLEXIBLE COUPLING

[75] Inventors: Thomas D. Gross, Los Altos; Brian E. Jogger, Union City, both of Calif.

[73] Assignee: Xerox Corporation, Stamford, Conn.

[21] Appl. No.: 369,779

[22] Filed: Apr. 19, 1982

[51] Int. Cl.³ .............................. F16D 3/20; B41J 1/30
[52] U.S. Cl. .................................... 464/115; 403/344; 464/147
[58] Field of Search ............... 464/106, 110, 112, 113, 464/114, 115, 120, 147; 403/57, 58, 311, 344

[56] References Cited

U.S. PATENT DOCUMENTS

| | | | |
|---|---|---|---|
| 536,696 | 4/1895 | Hirsh | 403/344 X |
| 832,044 | 10/1906 | Dickason | 403/311 |
| 1,337,642 | 4/1920 | Clark | 403/311 |
| 1,947,959 | 2/1934 | Williston | 403/344 X |
| 2,346,058 | 4/1944 | Waldron | 464/115 |
| 3,005,356 | 10/1961 | Gandrud | 403/344 X |
| 3,406,534 | 10/1968 | Chapper | 464/115 |
| 4,106,611 | 8/1978 | Suzuki et al. | 400/144.2 |
| 4,225,258 | 9/1980 | Thompson | 403/344 X |

OTHER PUBLICATIONS

IBM Technical Disclosure Bulletin, vol. 21, No. 1, Jun. 1978 (pp. 248-249).

Primary Examiner—Stuart S. Levy
Assistant Examiner—Daniel P. Stodola
Attorney, Agent, or Firm—Serge Abend

[57] ABSTRACT

An anti-backlash double universal flexible coupling for providing positive and accurate angular positioning, constant rotational velocity and constant torque between an input driving shaft and an output driven shaft. The coupling includes universal pins supported by the driving and driven shafts and an intermediate coupling link comprising two coupling plates having bearing surfaces urged against the pins by a resilient element. The pins are maintained coplanar and parallel between the coupling plates.

3 Claims, 7 Drawing Figures

PRIOR ART

ANTI-BACKLASH DOUBLE UNIVERSAL FLEXIBLE COUPLING

This invention relates to an improved double universal flexible coupling for use in a drive train wherein the output velocity and torque is to be maintained equal to the input velocity and torque over a duty cycle of rapid accelerations and decelerations, and wherein the dynamic settling time is to be minimized. The coupling includes an anti-backlash design to provide positive and accurate positioning of the output shaft, without "home seeking", when the input shaft is stopped.

Univeral joints are well known mechanical couplings for connecting rotating shafts whose axes intersect. Usually they are employed when the input and outputs shafts are angularly displaced at an angle greater than that which can be accommodated by other flexible couplings. It is also well known that in single universal joints, the angular velocity of the output (or driven) shaft fluctuates for a constant input (or drive) shaft velocity. The fluctuation is proportional to the angular displacement of the shafts and is minimized as the operating angle approaches zero. The driven shaft oscillates by lagging and leading the driving shaft, with the oscillatory motion producing both speed and torque variations which in turn result in fluctuating power transmission. However, it is further known that by utilizing a double universal joint system, a constant velocity output is possible if the operating geometry is properly arranged. This may be accomplished by accurately positioning the yoke forks on the intermediate shaft so that they are maintained in the same plane and parallel and also locating the input and output shafts relative to the intermediate shaft so that the input and output intermediate angles are equal. With such an arrangement, output oscillatory motion and torque fluctuations are confined within the intermediate shaft.

In our copending U.S. patent application Ser. No. 6-303,291 entitled "Print Element Shifter" (Gross et al), filed on Sept. 17, 1981, we have disclosed a shifting apparatus for repositioning a rapidly rotating printwheel print element bearing characters on two circular rows thereof. The shifter is designed to move the print element rapidly and accurately from a first operational position, wherein a printer hammer is aligned with the print characters of one circular row, to a second operational position wherein the printer hammer is aligned with the other circular row of characters. In other words, the rotary print element drive shaft is movable up and down relative to a spatially fixed motor drive shaft.

A double universal coupling utilized in the same environment is taught in U.S. Pat. No. 4,106,611 (Suzuki et al) entitled "Serial Printing Apparatus". In Suzuki et al, a dual concentric circle printwheel is shifted vertically, relative to its rotary drive motor, upon a shifter arm driven upwardly and downwardly by an electromagnet. As the printwheel is shifted, the drive train between the drive motor and the printwheel will vary in position and length, thus requiring a flexible coupling to be interposed therein. A double universal coupling is shown in several embodiments in FIG. 6 through FIG. 10. In FIG. 6 and FIG. 7 the illustrated coupling is shown in its basic form wherein it is not provided with backlash prevention means. In this form of the coupling, the rotary motion from the drive motor will cause the universal pins to skew within the slots provided therefor in the intermediate link. Thus, they will not be parallel at all times, resulting in variations in the driven velocity and driven shaft angular position relative to the drive motor velocity and its angular position. Since it is very important to control the precise location of the printwheel, especially when composite characters are constructed utilizing the extended character set afforded by the dual concentric circle printwheel, backlash prevention must be incorporated in the coupling. This has been done by Suzuki et al in the embodiment illustrated in FIGS. 8 and 9, wherein a presser member and an elastic ring urge the transverse universal pins against the opposite wall of the slots in the intermediate link.

We have found that the anti-backlash configuration of Suzuki et al, which relies upon a three pad universal pin support, is not entirely satisfactory. Therefore, we have improved upon it in such a way as to obtain a superior backlash inhibiting device which at once will result in an improved and uniform drive with lower driving friction and will be easier and less expensive to construct. The anti-backlash double universal coupling of our invention comprises, in one form, a driving input shaft supporting a transverse drive pin, a driven output shaft supporting a transverse driven pin, a pair of coupling plates having parallel facing bearing surfaces for sandwich mounting upon the transverse pins, positioning pins supported in each of the plates for preventing lateral movement thereof and a resilient binding member for urging the coupling plates together upon the transverse pins.

The features and advantages of our invention will become clear from the following detailed description taken with the accompanying drawings, in which.

Figure 1:
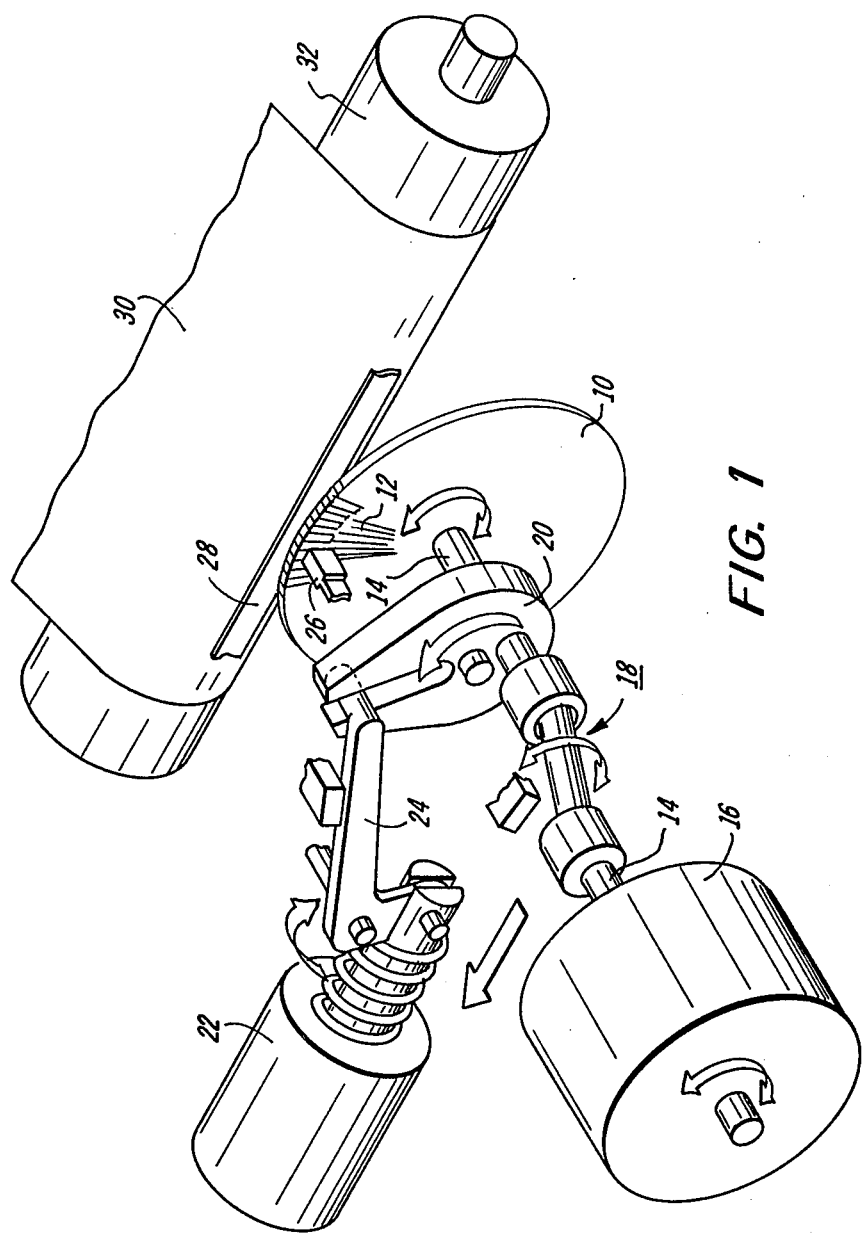
FIG. 1 is a perspective view showing a printwheel driving and shifting apparatus with a double universal coupling in the drive train.

With particular reference to the drawings, there is shown in FIG. 1 one environment in which the novel double universal coupling of the present invention may be incorporated. A printwheel 10 having radial spokes 12 and two concentric circles of characters is mounted on a drive shaft 14 rotatable in either a clockwise or a counterclockwise direction. The printwheel is driven by a reversible rotary drive motor 16 through a drive train which incorporates the double universal coupling 18. The printwheel 10 may be shifted up or down (as viewed in FIG. 1), to address either the inner or outer character circle, by means of a shifting cam 20 driven by shifting solenoid 22 through shifting link 24. Once in place, the selected character may be impacted by hammer 26 to drive it against inked ribbon 28 for releasing the ink in image configuration upon a record receiving member 30 supported upon platen 32.

Once the machine logic identifies the subsequent character to be addressed, it will signal the motor 16 to rotate in the appropriate direction to reach the next character in the shortest distance. Thus, the printwheel may be rotated in either a clockwise or counterclockwise direction from character to character. Then, the motor will stop for an instant while the hammer impacts the character, and the sequence is repeated. This rapid starting and stopping requires a drive train which will accurately translate the rotary motor motion to the printwheel and, in particular, a drive train which will insure that as the printwheel arrives at its character position the dynamic settling time will be minimized. Also, in some printers it may be possible to print on-the-fly, i.e. without stopping the printwheel. In that case, it becomes even more important that the drive train translate the correct angular position to the printwheel, even while in motion.

In the device of FIG. 1, the printwheel is to be shifted, and a rigid, straight through drive cannot be used. A flexible drive train is required. The problem generally encountered in flexible drive trains, is backlash in the flexible members or elements. Backlash will adversely affect the constancy of angular position and velocity between input and output.

Figure 2:
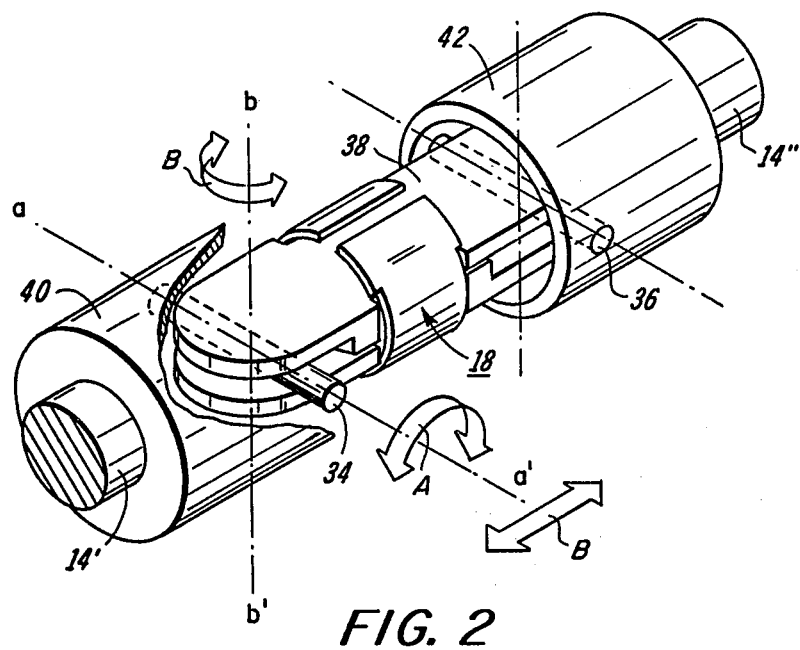
FIG. 2 is a perspective view of one form of the anti-backlash double universal flexible coupling of the present invention showing the degrees of freedom of the transverse pins.

In FIG. 2 the double universal flexible coupling of this invention is illustrated to show the freedom of motion required of universal pins 34 and 36 relative to the intermediate coupling link 38. The driving shaft 14' terminates in a yoke 40 in which universal pin 34 is secured and that driven shaft 14'' terminates in a yoke 42 in which universal pin 36 is secured. Arrow A indicates the movement of coupling link 38 about the pin axis a—a'. Arrow B (we will refer to this movement as "slewing") indicates the movement of the coupling link about axis b—b' which is normal to the length dimension of the coupling link and to the pin axis. And arrow C indicates the movement of the coupling link relative to the universal pin 34 in the axial direction of the drive train, for shortening the overall length of the drive train. Although the directions of movement of the coupling link relative to the universal pin 34 have been indicated, it should be understood that there is a similar relative movement between the universal pin 36 and the coupling link 38. As discussed above, in order for the output angular velocity and torque to be the same as the input values, the universal pins 34 and 36 must always lie in the same plane and be parallel.

Figure 3:
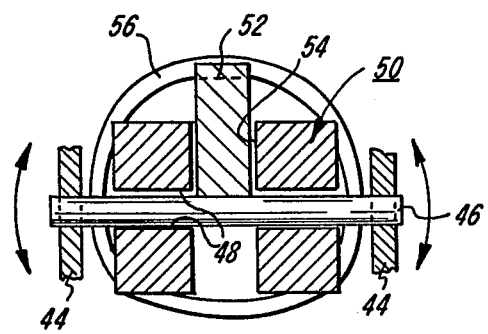
FIG. 3 is a representation of a section taken through one of the universal joints of the Suzuki et al patent, referenced above.

The prior art solution to this problem, as discussed above, (Suzuki et al, U.S. Pat. No. 4,106,611, FIGS. 8 and 9) has been representationally illustrated in FIGS. 3 and 4, herein. Only a single universal joint has been shown, in section, but it is believed that its shortcomings can be readily understood and can be extrapolated to the dual universal coupling. A yoke 44 supports universal pin 46 within slot 48 formed in intermediate coupling link 50. An anti-backlash presser member 52 positioned in a transverse slot 54 in one side of the coupling link is urged downwardly by resilient member 56 to press universal pin 46 against the bottom walls of slot 48.

Figure 4:
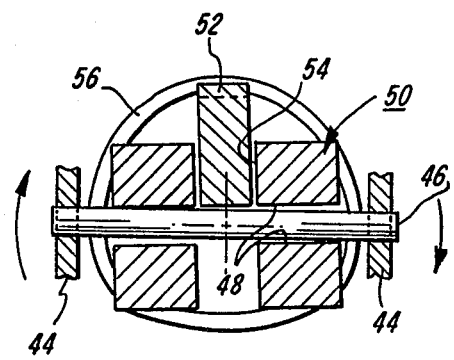
FIG. 4 is a representation similar to FIG. 3 showing the effect of driving torque upon one of the universal joints.

During periods of high torque, such as is encountered in rapid rotary acceleration and deceleration, the force transmitted through universal pin to the presser member acts on a short moment-arm and tends to skew the pin 46 as shown in FIG. 4, yielding the disadvantageous results described above. If one were to attempt to overcome the shortcomings of this design by utilizing a more powerful resilient member 56, the pressing force transmitted through presser member 52 to universal pin 46 could be strong enough not to be overcome by high torque driving conditions. However, a new drawback would be created, namely, a dramatic increase in friction in the surface area movements between the universal pin and the coupling link, referred to as slewing (arrow B) and drive train length varying (arrow C), increasing the load on the driving motor. Thus, it should be understood that a balance must be achieved between the pressing force necessary for backlash prevention and the minimization of that force for the pin/link surface area movements.

Figure 5:
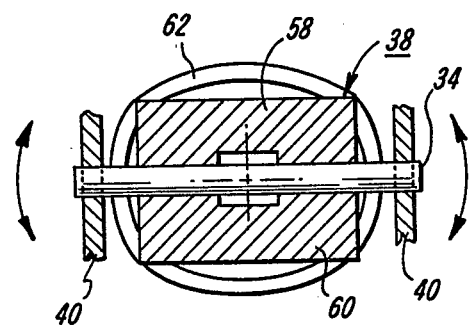
FIG. 5 is a representation of a section taken through one of the universal joints of the present invention.

Such a balance has been achieved in the double universal coupling of the present invention. A cross-sectional representation of our invention is shown in FIG. 5. A larger surface of contact between the universal pin 34 and the coupling link 38 has been provided by splitting the link into two halves 58 and 60. A weaker spring 62 may be used to hold the halves against the universal pin since, with the longer moment-arm, the torque necessary to cause skewing is generally greater than the maximum torque applied during rapid acceleration and deceleration.

Figure 6:
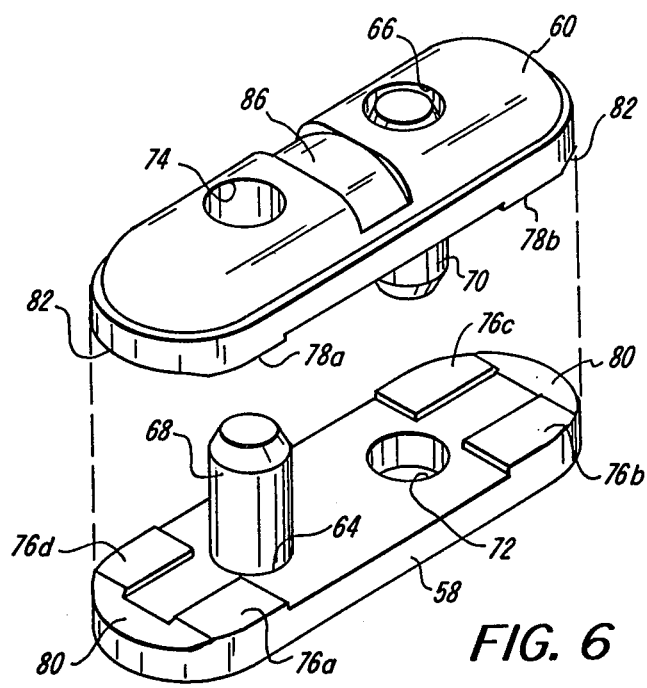
FIG. 6 is an exploded perspective view of another form of our double universal coupling plates.
Figure 7:
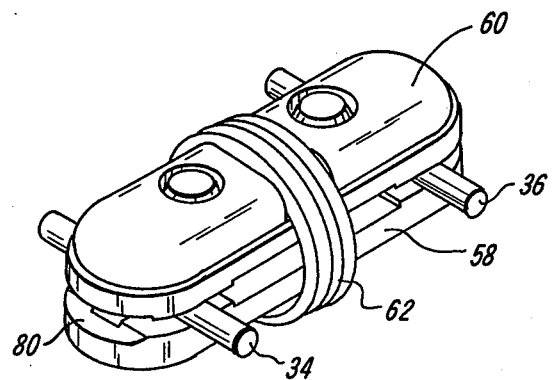
FIG. 7 is a perspective view of the double universal coupling plates of FIG. 6 relative to the transverse universal pins.

The coupling link 38 as shown in its preferred form in greater detail in FIG. 6, comprises the two identical halves 58 and 60. Each half is provided with a bore 64,66 within which an interlocking stud 68,70 is press fit, and a slightly larger bore 72,74 for receiving the stud from the opposite half. When the connecting link is assembled, the interlocking studs insure that the link halves do not shift, one relative to the other. On the facing surfaces, four pads 76 (a–d), 78 (only a and b visible) have been machined to form highly accurate planar surfaces against which the universal pins may be urged. Beveled entrance ramps 80,82 are machined on the ends of each half to enable the link to be readily slipped upon the yoke mounted universal pins 34 and 36 during assembly. A further seat 86 (only one shown), is provided on the outer surface of each link to capture the coil spring 62 and prevent its wandering along the length of the link.

In achieving an improved anti-backlash double universal flexible coupling having a large area of pin/link contact and a relatively low spring pressing force, we have achieved considerable concomitant cost savings due to the identical half link design. This design has enabled lower parts manufacturing costs and reduced assembly costs. It should be appreciated, however, that although the present disclosure has been made by way of example, numerous changes in details of construction and the combination and arrangement of parts may be made without departing from the true spirit and scope of the invention as hereinafter claimed. For example, the surface area of pin/link contact may extend completely across each link half, thereby eliminating the separate seating pads. Also, any number of different interlocking configurations may be utilized in lieu of the studs shown. Further, any suitable resilient member may be substituted for the coil spring shown, as long as the universal pins are prevented from skewing and the freedom of areal movement of the pins is not affected to the degree that it will thereby unduly load the drive motor.

What is claimed is:

1. An anti-backlash double universal flexible coupling characterized by including rotary driving means, a driving pin secured to said driving means and supported at both its ends, rotary driven means, a driven pin secured to said driven means and supported at both its ends, intermediate coupling means connected between said rotary driving and driven means, said coupling means comprising a pair of substantially identical coupling plates disposed parallel to one another and having at their ends, flat, facing bearing surfaces extending across the width dimension of said plates, said width dimension being substantially coextensive with the unsupported length of said pins, and between which said driving pin and said driven pin are captured for movement therealong, said pins being maintained coplanar and parallel to one another by said coupling means during movement to prevent skewing, and resilient means for urging said coupling plates together and into contact with said pins.

2. The anti-backlash double universal coupling as set forth in claim 1 characterized in that said coupling plates each include interlocking means for allowing said plates to move freely toward and away from one another yet inhibit lateral sliding movement between said plates.

3. The anti-backlash double universal flexible coupling as set forth in claim 1 characterized in that said bearing surfaces comprise spaced pads extending to the edge of the width dimension of said plates.

* * * * *